United States Patent [19]
Seegert

[11] Patent Number: 5,937,625
[45] Date of Patent: Aug. 17, 1999

[54] MOWER DECK SUSPENSION MECHANISM

[75] Inventor: Brian David Seegert, Hartford, Wis.

[73] Assignee: Deere & Company, Moline, Ill.

[21] Appl. No.: 08/872,517

[22] Filed: Jun. 10, 1997

[51] Int. Cl.[6] .................................................. A01D 34/03
[52] U.S. Cl. ..................... 56/15.6; 56/16.7; 56/DIG. 9; 56/DIG. 22
[58] Field of Search .................... 56/14.9, 15.6, 56/15.9, 16.3, 16.7, 17.1, 15.7, DIG. 9, DIG. 14, DIG. 22

[56] References Cited

U.S. PATENT DOCUMENTS

| | | | |
|---|---|---|---|
| 2,972,850 | 2/1961 | Ariens et al. . | |
| 3,680,292 | 8/1972 | McCanse | 56/16.3 X |
| 3,706,186 | 12/1972 | Hurlburt et al. | 56/16.3 X |
| 5,025,617 | 6/1991 | Kuhn et al. | 56/15.6 |
| 5,154,043 | 10/1992 | Schemelin et al. | 56/15.6 X |
| 5,303,532 | 4/1994 | Phillips | 56/DIG. 9 X |

OTHER PUBLICATIONS

Deere & Co., Parts Catalog PC2106 entitled "RX63, RX75, SX75, RX95, SX95 Riding Lawn Mower", pp. 85–1, 85–2, 85–3, 85–10 and 85–11, dated Mar. 20, 1992, published in the U.S.A.

Deere & Co., Parts Catalog PC2317 entitled "LX172, LX176, LX178, LX186 and LX188 Lawn Tractors", pp. 85–22 and 85–23, dated Feb. 1, 1994, published in the U.S.A.

Deere & Co., Parts Catalog PC2399 entitled "STX38 STX46 (Black Mower Deck) Lawn Tractors", pp. 85–4 and 85–5, dated Sep. 19, 1995, published in the U.S.A.

*Primary Examiner*—Heather Shackelford

[57] ABSTRACT

A mechanism for suspending a mower deck from a vehicle, including a suspension member having a longitudinally extending axis and a laterally extending portion which supports the deck at a plurality of spaced locations. A structural member fixed with the vehicle includes an opening within which the suspension member is positioned. A position retainer is coupled with the suspension member and abuts the structural member for blocking the suspension member from shifting along its longitudinal axis out of the opening. Engagement of the suspension member within the opening of the structural member is the sole location at which the suspension member is connected to the vehicle. A removable blocking member is positioned adjacent the opening for generally blocking the suspension member from shifting laterally with respect to its axis and out of the opening. The opening is defined in a surface oriented generally perpendicular to the axis of the suspension member.

34 Claims, 4 Drawing Sheets

MOWER DECK SUSPENSION MECHANISM

This invention relates to mechanisms which couple a mower deck to a vehicle such as a lawn tractor.

Conventional mower decks are suspended from vehicles such as lawn tractors by many different prior art linkages. Such decks are typically suspended from the belly of a lawn tractor between the tractor's front and rear pairs of tires. When properly adjusted the decks are typically oriented in level horizontal fashion or are tilted slightly downwardly at the front of the deck. When the deck is not properly oriented, grass may be cut unevenly resulting in poor cut quality. One common type of suspension mechanism is a four bar linkage that allows the deck to be raised and lowered for cutting height adjustments while keeping the deck in its proper orientation. The operator may wish to remove the deck from the vehicle for maintenance or other purposes. To remove the deck from the vehicle the operator typically must lift the deck vertically to provide enough slack in the linkage to disengage the linkage from the deck or vehicle. Once disengaged, the deck can be slid from beneath the lawn tractor. Lifting the deck can be a difficult operation since mower decks can be quite heavy. Lifting the deck can also be quite awkward for the operator, since he is often required to lift the deck with one hand and simultaneously uncouple the linkage from the lawn tractor or deck at a location beneath the tractor with the other hand.

One particular type of four bar linkage for suspending a mower deck includes a generally U-shaped rod which couples the front of the deck to the lawn tractor, and is generally shown in U.S. Pat. No. 5,025,617. The base of the U-shaped rod is received by a pair of hooks formed in plates which extend forwardly from the deck. The upper end portions of the U-shaped rod are received within openings in the front axle of the tractor. Nuts which are threaded onto the upper end portions of the U-shaped rod operatively couple the rod to the vehicle and prevent the U-shaped rod and deck from dropping to the ground. This type of linkage secures the deck to the tractor during operation even over rough bumpy terrain. To remove the deck from the vehicle some operators utilize the attaching mechanisms shown in U.S. Pat. No. 5,025,617. The attaching mechanism shown in that patent includes a relatively large number of parts which tends to increase the manufacturing cost of the lawn tractor. Operators of lawn tractors with this type of U-shaped rod but which lack the attaching mechanism shown in U.S. Pat. No. 5,025,617 often lift the deck until the base of the U-shaped rod form can be swung rearwardly out of the hooks. This can be a difficult and awkward task. To avoid lifting the deck in this manner, other operators remove the deck by removing the nuts from the upper end portions of the U-shaped rod. This allows the ends of the U-shaped rod to slide out of the openings in the axle such that the U-shaped rod and deck drop to the ground. Once the deck suspension linkages at the rear of the deck are uncoupled, the deck can be slid laterally from beneath the lawn tractor. When the operator wishes to re-mount the deck to the lawn tractor he might do so by positioning the upper ends of the U-shaped rod within the openings in the axle and then tighten the nuts back onto the threaded end portions with a power tool. If this is done with the deck hooked to the U-shaped rod, then large forces are imparted to the nut when threaded onto the rod with a power tool, which can cause wear and damage to the nuts. Furthermore, when the nuts are replaced in this manner the operator may not know exactly where to re-position the nuts on the threads. If the nuts are not replaced in the proper position, the deck may be suspended in a non-level fashion which might result in poor cut quality. Also, if the nuts are not replaced in the proper position, the belts and pulleys which drive the mower blades may be misaligned at least slightly. Such misalignment can cause rapid belt wear and malfunction of the belt drive system.

It would therefore be desirable to provide a mechanism that suspends a mower deck from a lawn tractor vehicle and that allows an operator to easily remove the deck from the tractor without exerting significant effort and without requiring the use of tools. It would also be desirable for such a suspension mechanism to prevent the deck from becoming uncoupled from the tractor during operation, even when mowing over rough or bumpy terrain. It would be desirable for such a mechanism to allow an operator to easily remount the deck to the tractor such that the deck is returned to its proper position and orientation without requiring the use of tools. It would be desirable for such a mechanism to be relatively simple in construction and comprised of relatively few parts such that assembly and part costs are relatively low.

SUMMARY OF THE INVENTION

The deck suspension mechanism according to the present invention is adapted to suspend a mower deck from the belly of a lawn tractor vehicle, and includes a suspension member or rod member having a laterally extending rear portion which operatively engages the deck at a plurality of spaced locations for generally supporting the deck. The rod member includes a longitudinally extending axis defined by a threaded portion of the rod member. The threaded portion of the rod member is positioned within a slot formed in a structural member carried by the vehicle. A position retainer which includes a nut and ball member is coupled with the threaded end portion of the rod member and operatively abuts the structural member for blocking the rod member from shifting along its axis out of the slot. Engagement of the rod member and position retainer against the structural member is the sole location at which the front portion of the deck is connected to the vehicle. A selectively removable blocking member or cross pin is positioned adjacent the structural member's slot and generally blocks the rod member from shifting generally laterally with respect to its axis up and out of the opening. The structural member includes a surface oriented generally perpendicular to the axis of the threaded portion of the rod member, which allows the operator to slide the ball easily along said surface and out of an enlarged portion of the slot when the blocking member is removed. The structural member according to the preferred embodiment is fixed with a pivotal front axle of a vehicle.

A second support linkage extends between the vehicle and a rear portion of the deck for suspending the rear portion of the deck from the vehicle. The rod member is coupled with the vehicle at a single location and the second support linkage is coupled with the vehicle at least two locations.

The present invention allows the operator to remove the deck from the vehicle by pulling the cross pin and lifting the rod member out of the slot in the structural member. The inclination of the structural member allows the operator to lift the rod member to the enlarged portion of the slot with relatively little effort. To re-couple the front portion of the deck to the lawn tractor, the operator positions the rod member in the enlarged portion of the slot, pulls upwardly on the rod member until the nut and ball member pass through the enlarged portion of the slot, and then shifts the rod member downwardly until it is positioned in the lowermost end of the slot. The operator can then place the cross pin in position to block the rod from shifting out of the enlarged portion of the slot. The present invention therefore allows removal and replacement of the deck without requiring the use of tools. The operator can lift the rod upwardly through the enlarged portion of the slot for re-attachment of the deck without being required to lift the deck with one hand at one location and couple the deck to the vehicle at another location in awkward fashion. Since the operator does not adjust or remove the nut during the deck removal or re-attaching procedures, the deck will automatically be returned to its proper position and orientation when re-attached.

DETAILED DESCRIPTION OF THE PREFERRED EMBODIMENT

Figure 1:
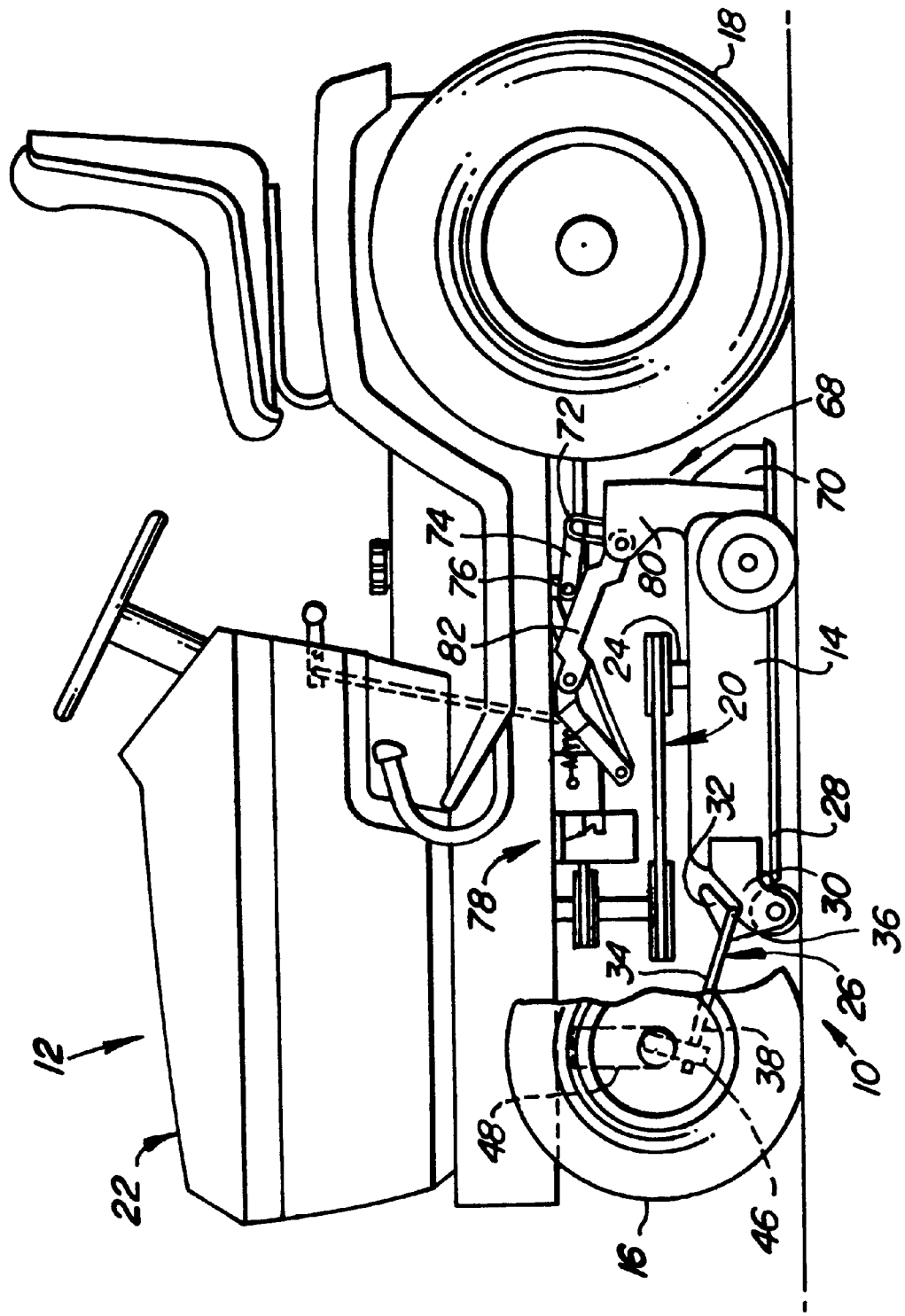
FIG. 1 is a side view of a lawn tractor having a mower deck suspended by the linkage according to the present invention.

Referring now to FIGS. 1–5, there is shown the deck suspension mechanism 10 according to the present invention. The deck suspension mechanism 10 is adapted for use with a lawn tractor vehicle 12, as best seen in FIG. 1, having a mower deck 14 carried beneath the lawn tractor 12 between the tractor's front and rear pairs of wheels 16. At least one mower blade rotates within the mower deck 14 for cutting grass beneath the deck 14. A drive mechanism 20 such as a belt drive system transmits rotational power from the vehicle power source or engine 22 to the mower deck spindles 24 to which the cutting blades are coupled.

A first deck suspension linkage 26 couples the front or first portion 28 of the deck 14 to the tractor 12. A pair of plate members 30 are fixed as by welds to the front portion 28 of the deck 14. The plate members 30 define hooks 32 that open generally rearwardly and upwardly. A suspension member or rod member 34 is provided which includes a laterally extending portion 36 which is engaged with the hooks 32 of the plate members 30. The rod member 34 is shaped to define a forward portion 38 which extends generally longitudinally with respect to the lawn tractor 12. The forward portion 38 of the rod member 34 includes a threaded end portion 40 which receives a ball member 42 and a nut 44. The nut 44 holds the ball member 42 in place for engagement with socket portion 45 of a structural member 46 that is fixed as by welds to the pivotal front axle 48 of the lawn tractor 12. The front axle 48 pivots about an axis 50 as the front wheels 16 of the lawn tractor 12 encounter ground undulations during operation. The forward end portion 38 of the rod member 34 is positioned within a slot 52 formed in a generally planar surface portion 54 of the structural member 46. The slot 52 extends generally vertically according to the preferred embodiment of the present invention. During operation the end portion 38 of the rod member 34 is pulled downwardly and rearwardly by the weight of the deck 14 to the lowermost end portion 56 of the slot 52. The top portion 58 of the slot 52 includes an enlarged portion 60 which is sized large enough to allow the ball member 42 and nut 44 to pass there-through when the operator wishes to remove the deck 14 from the lawn tractor 12. A cross pin 62 is positioned within a pair of openings 64 in the structural member 46, and is held in position by a spring pin 66 or other suitable device. The cross pin 62 is positioned generally across the slot 52 beneath the enlarged portion 60 of the slot 52, and thereby prevents or blocks the rod member 34 from rising up out of the lowermost end portion 56 of the slot 52 during mowing operations. The cross pin 62 thereby blocks the end portion 38 of the rod member 34 from shifting or bouncing upwardly within the slot 52 to a position whereat the ball 42 and nut 44 could pass through the enlarged portion 60 of the slot 52.

Figure 2:
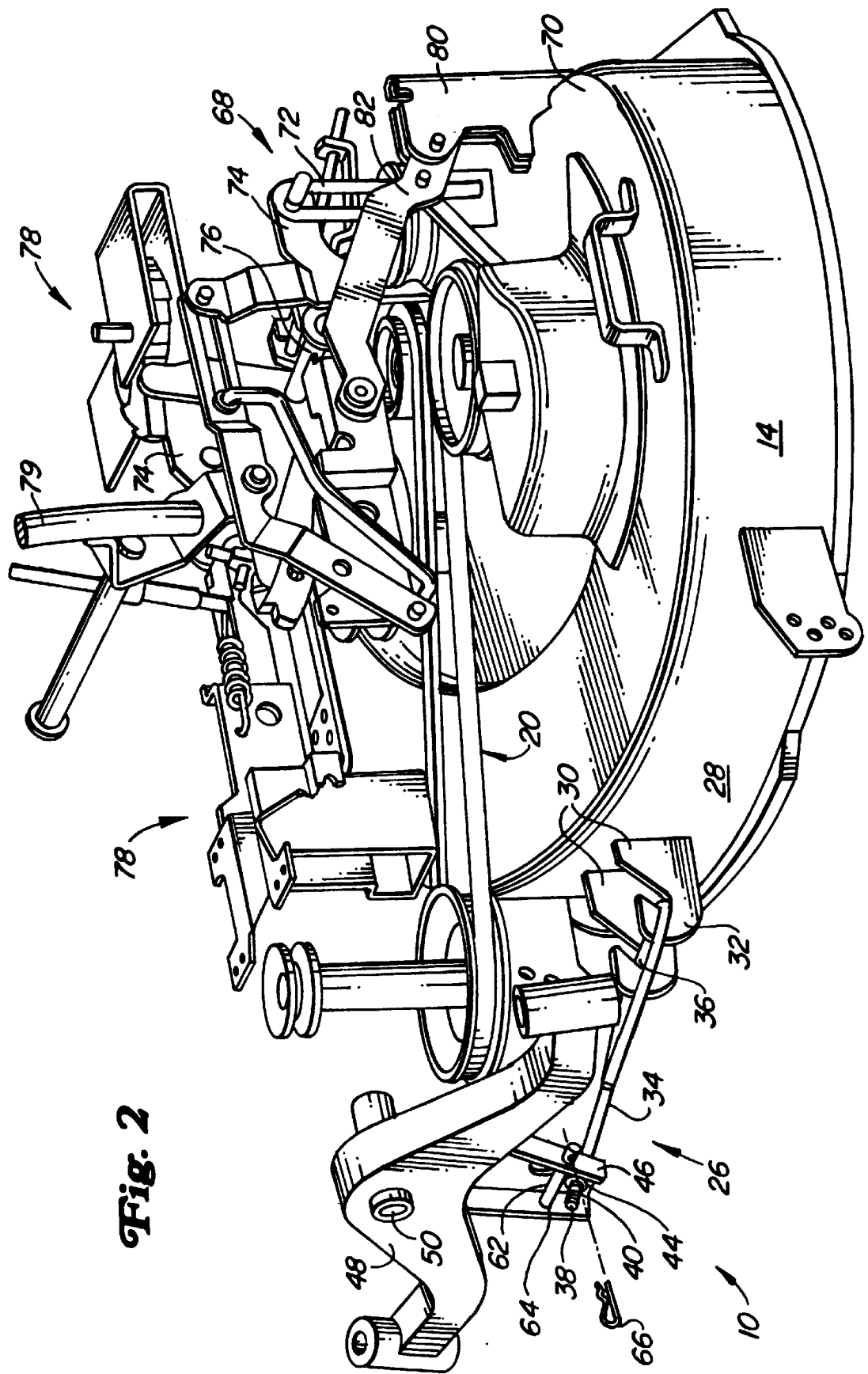
FIG. 2 is a perspective view of the deck suspension linkage beneath the lawn tractor according to the present invention, and also shows the deck height adjustment mechanism.
Figure 3:
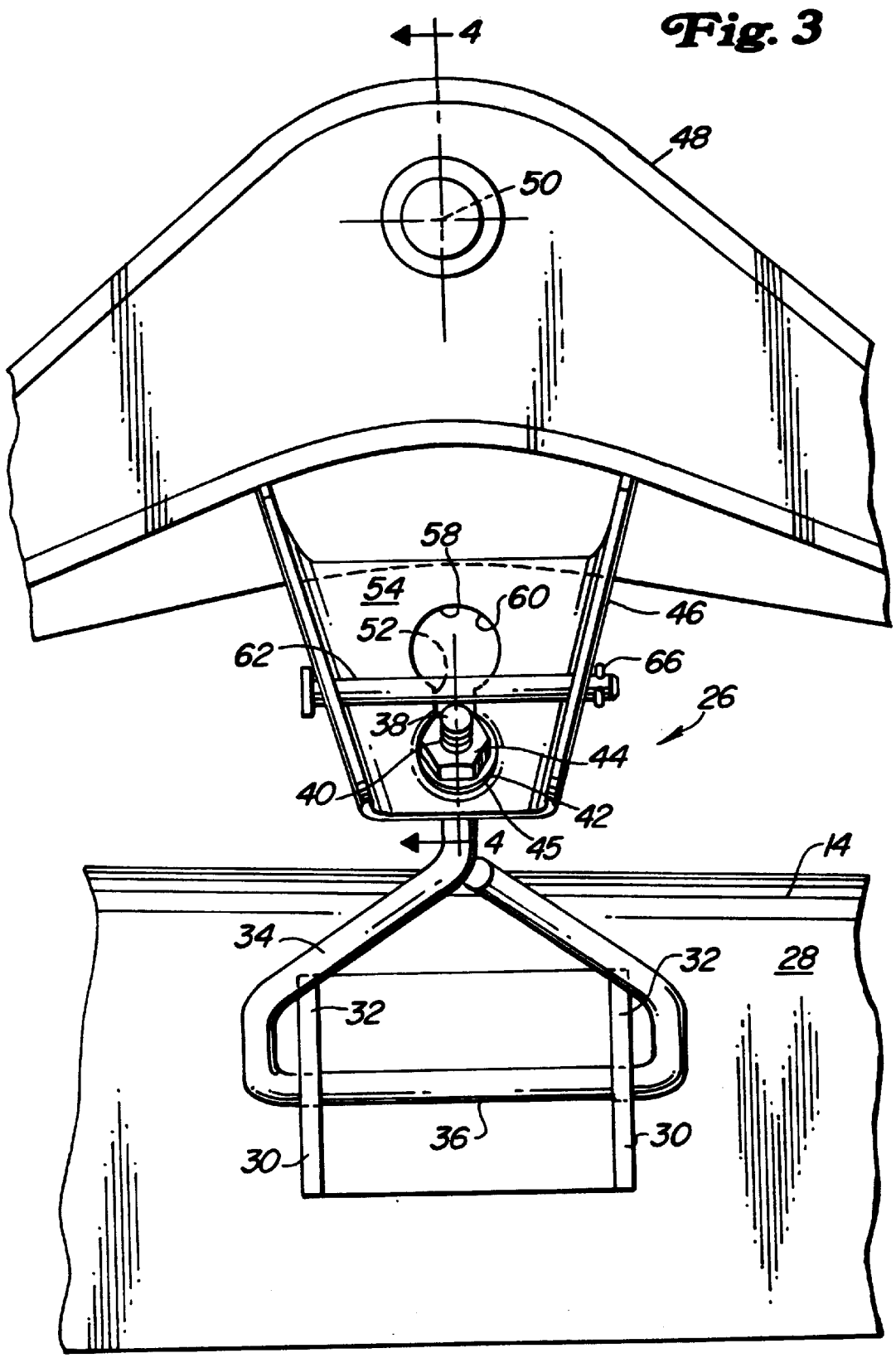
FIG. 3 is a partial front view of the mower deck and suspension linkage mechanism according to the present invention.
Figure 4:
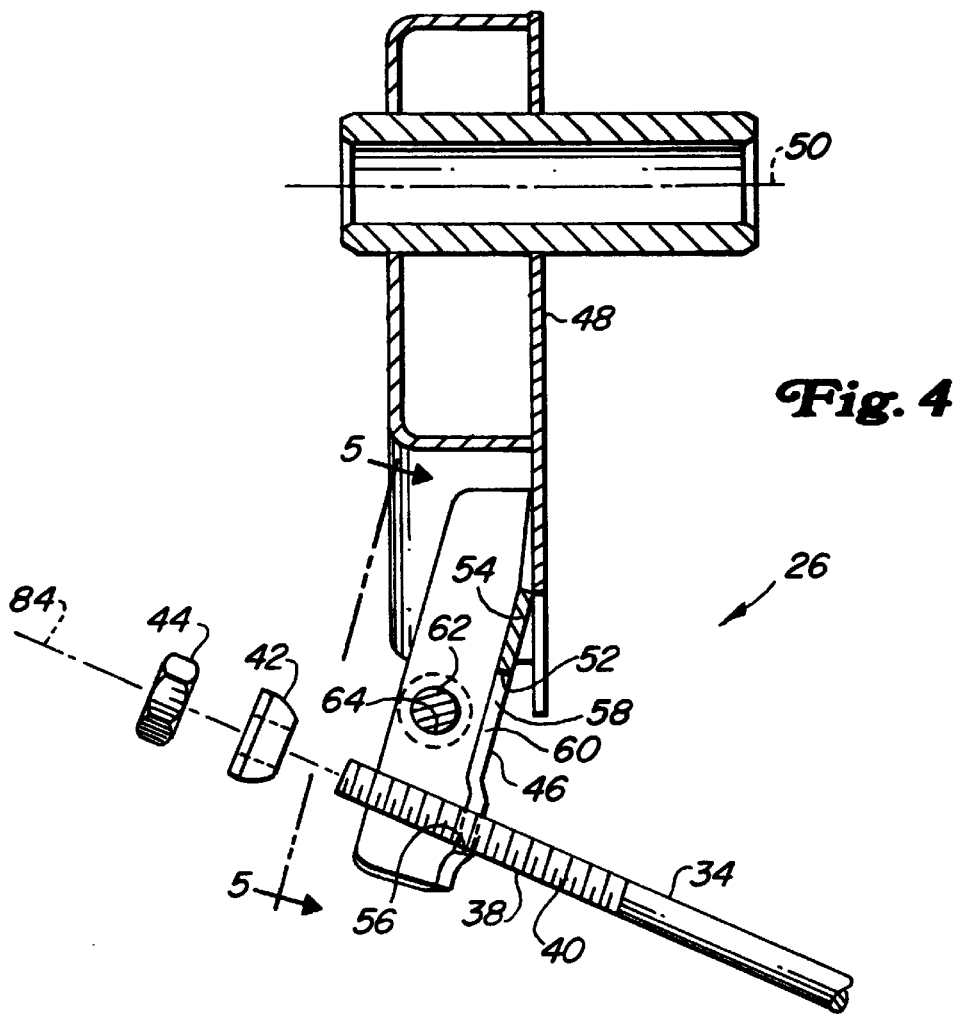
FIG. 4 is an exploded side view of the front portion of the suspension linkage according to the present invention.
Figure 5:
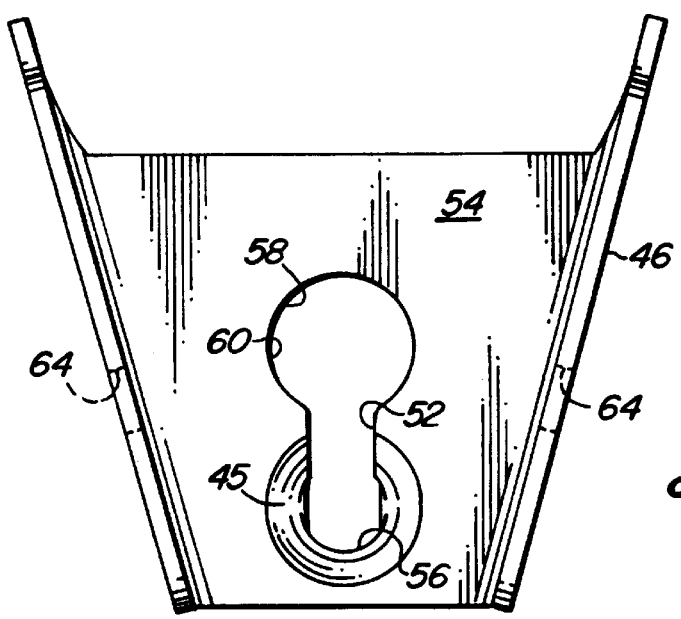
FIG. 5 is a front view of the structural member within which the rod member according to the present invention is supported during operation.

A second deck suspension linkage 68 is provided which couples the rear or second portion 70 of the mower deck 14 with the vehicle 12. As seen in FIGS. 1 and 2, a pair of link members 72 extend upwardly from the rear 70 of the deck 14. A pair of lift arms 74 operatively engage the link members 72, and are mounted to a laterally extending pivot shaft 76. The pivot shaft 76 is selectively pivotable by the operator by way of a manual lift mechanism 78. As the operator engages hand lever 79, the lift mechanism 78 pivots the pivot shaft 76, and the lift arms 74 will pivot therewith, causing the link members 72 to shift up or down with the rearward end of the lift arms 74. This serves to lift or lower the deck 14 to the desired cutting height.

A pair of brackets 80 are also coupled with the rear portion 70 of the deck 14. A pair of straps 82 are coupled between respective brackets 80 and portions of the vehicle frame. The straps 82 and front rod member 34 act as a four bar linkage that raises and lowers the deck 14 in the proper orientation. The straps 82 bear little or no weight of the deck 14 during operation.

Next, the operation of the present invention will be discussed in greater detail. During operation, the threaded front end portion 40 of the rod member 34 is positioned within the lowermost end portion 56 of the slot 52, and the laterally extending rear portion 36 of the rod member 34 is engaged by the plate hooks 32. The rod member 34 is in tension between the structural member 46 and the plates 30. The nut 44 threaded onto the end portion 38 of the rod member 34 abuts the ball member 42, which in turn abuts against the structural member 46. The nut 44 prevents the threaded end portion 40 of the rod member 34 from shifting longitudinally along its axis and out of the slot 52. The ball member 42 abuts the rounded socket portion 45 of the structural member 46 for allowing the rod member 34 to pivot easily in response to the deck 14 swinging or shifting up and down as ground undulations are encountered or during cutting height adjustments. The socket portion 45 generally mates with the shape of the ball member 42 and helps retain the ball member 42 in the lowermost end portion 56 of the slot 52. The cross pin member 62 extends generally across the slot 52 at a location directly above the threaded front end portion 40 of the rod member 34. The cross pin 62 prevents the rod member 34 from shifting up within the slot 52 during operation, and thereby generally blocks the rod member 34 from shifting out of the enlarged portion 60 of the slot 52 during operation.

The operator can remove the deck 14 for maintenance such as blade sharpening or blade replacement. The first deck suspension linkage 26 according to the present invention makes removal of the front portion 28 of the deck 14 a relatively simple operation. The operator simply removes the spring pin 66 from the cross pin 62, and then removes the cross pin 62 from the openings 64 in the structural member 46. With the cross pin 62 removed from the structural member 46, clearance is provided for the threaded end portion 40 of the rod member 34 to shift upwardly within the slot 52 to the enlarged portion 60. With the cross pin 62 removed, the operator can grasp the rod member 34 and slide the rod member 34 upwardly within the slot 52. The ball member 42 will slide in contact with the surface 54 of the structural member 46. The surface 54 is inclined slightly and is oriented approximately perpendicular with the longitudinal axis 84 of the threaded end portion 40 of the rod member 34. This allows the operator to shift the rod member 34 upwardly relatively easily without requiring the operator to pull forwardly on the rod member 34 with a large force. As the rod member 34 enters the enlarged portion 60 of the slot 52, the rod member 34 will be pulled rearwardly through the enlarged portion 60 of the slot 52 by the weight of the front portion 28 of the deck 14. The front portion 28 of the deck 14 can then be lowered to the ground, and the rear 70 of the deck 14 can then be detached for complete removal of the deck 14 from the lawn tractor 12. The present invention therefore allows an operator to uncouple the front portion 28 of the deck 14 from the lawn tractor vehicle 12 without the use of tools such as power wrenches, and without requiring the operator to exert large forces to lift the deck 14 in an awkward manner.

After blade sharpening or other maintenance operations have been completed, the operator can re-attach the deck 14 to the lawn tractor 12. To do so the operator slides the deck 14 laterally to a position beneath the lawn tractor 12 and reattaches the rear portion 70 of the deck 14 to the vehicle 12. The operator can then re-couple the front 28 of the deck 14 to the lawn tractor 12. With the laterally extending portion 36 of the rod member 34 positioned within the plate hooks 32, the operator can position the threaded portion 40 within the enlarged portion 60 of the slot 52. The operator can then pull upwardly and forwardly on the rod member 34 until the nut 44 and ball member 42 pass forwardly through the enlarged portion 60 of the slot 52. The rod member 34, nut 44 and ball member 42 can then be lowered until the rod member 34 is positioned in the lowermost end portion 56 of the slot 52. Lowering the rod member 34, nut 44 and ball member 42 to this position is facilitated by the orientation of the surface 54 of the structural member 46 which extends generally perpendicular to the threaded end portion 40 of the rod member 34. The ball member 42 is allowed to easily slide down along the surface 54 without requiring the operator to apply a large lifting force to the rod 34. With the end portion 38 of the rod 34 lowered into position, the nut 44 will maintain the ball member 42 in abutment against the structural member 46 such that the rod member 34 is supported and the front portion 28 of the deck 14 is suspended in proper operating position above the ground. The operator can then position the cross pin 62 within the openings 64 in the structural member 46, and the spring pin 66 can be inserted into the cross pin 62.

The nut 44 can be adjusted on rod member 34 for adjusting the position of the front portion of the deck so that the deck remains properly oriented after long periods of operation.

The present invention allows the operator to re-couple the front portion 28 of the deck 14 to the lawn tractor 12 without requiring the use of tools. The operator can lift the rod 34 upwardly through the enlarged portion 60 of the slot 52, and is not required to lift the deck 14 with one hand at one location and couple the deck 14 to the vehicle 12 at another location in an awkward fashion. Since the operator does not adjust or remove the nut 44 during the deck removal or re-attaching procedures, the deck 14 will automatically be returned to its proper position and orientation when re-attached.

I claim:

1. A deck suspension mechanism comprising:
    a structural member carried by a vehicle and which includes an opening,
    a first support linkage for suspending a first portion of a mower deck from the vehicle, said first support linkage comprising:
        a suspension member, having a longitudinally extending axis, said suspension member includes a longitudinally extending portion positioned within the opening in the structural member during mowing operation,
        a position retainer coupled with the longitudinally extending portion of the suspension member and in operative abutment with the structural member for blocking the longitudinally extending portion of the suspension member from shifting along its axis out of the opening,
        a selectively removable blocking member positioned generally adjacent the opening in the structural member for blocking the suspension member from shifting out of the opening generally lateral with respect to its axis.

2. The invention of claim 1, and further comprising a second support linkage extending between the vehicle and a second portion of the deck for suspending said second portion of the deck from the vehicle.

3. The invention of claim 1, wherein said structural member includes a surface oriented generally perpendicular to the longitudinally extending axis of the suspension member, said orientation of said surface allowing the position retainer to slide along said surface out of the opening when the blocking member is removed.

4. The invention of claim 1, wherein the suspension member operatively engages the deck at a plurality of spaced locations for generally supporting the deck.

5. The invention of claim 2, wherein said suspension member operatively engages the structural member at not more than a single location.

6. The invention of claim 1, wherein said first support linkage is coupled with the vehicle at a single location and the second support linkage is coupled with the vehicle at at least two locations.

7. The invention of claim 1, wherein said suspension member further comprises:
    a rod member having a longitudinally extending portion which is positioned within the opening in the structural member, and
    a laterally extending portion which engages the deck at a plurality of laterally spaced locations.

8. The invention of claim 1, wherein said blocking member is a cross pin selectively removable by an operator for allowing the suspension member to be lifted and removed from the opening.

9. The invention of claim 1, wherein said position retainer further comprises a nut received by a threaded portion of the suspension member.

10. The invention of claim 1, wherein said structural member is fixed with a pivotal front axle of a vehicle.

11. The invention of claim 1, wherein the position retainer is adjustable along the longitudinally extending portion of the suspension member for adjusting the position of the mower deck.

12. A mower deck suspension mechanism comprising:
a first support linkage for suspending a first portion of a mower deck from a vehicle, said first support linkage comprising:
  a suspension member, having a longitudinally extending axis, said suspension member operatively engages the deck at a plurality of spaced locations for generally supporting the deck,
  a structural member carried by the vehicle and which includes an opening within which a longitudinally extending portion of the suspension member is positioned,
  a position retainer coupled with the longitudinally extending portion of the suspension member and which is operatively abuttable with the structural member for blocking the suspension member from shifting along its axis out of the opening, wherein engagement of a single longitudinally extending portion of the suspension member within the opening of the structural member is the sole location at which the suspension member is connected to the vehicle,
  a selectively removable blocking member positioned adjacent the opening in the structural member for generally blocking the suspension member from shifting out of the opening generally laterally with respect to the longitudinally extending axis of the suspension member.

13. The invention of claim 12, wherein said structural member includes a surface oriented generally perpendicular to the axis of the suspension member, said orientation of said surface allowing the position retainer to slide easily along said surface out of the opening when the blocking member is removed.

14. The invention of claim 13, wherein said suspension member further comprises a rod member defining the longitudinally extending portion which is positioned within the opening in the structural member, and a laterally extending portion which engages the deck at a plurality of laterally spaced locations.

15. The invention of claim 14, wherein said blocking member is a cross pin selectively removable by an operator for allowing the suspension member to be lifted and removed from the opening.

16. The invention of claim 15, wherein the position retainer is adjustable along the longitudinally extending portion of the suspension member for adjusting the position of the mower deck.

17. The invention of claim 15, wherein said position retainer further comprises a nut received by a threaded portion of the suspension member.

18. The invention of claim 17, wherein said structural member is fixed with a pivotal front axle of a vehicle.

19. The invention of claim 18, and further comprising a second support linkage extending between the vehicle and a second portion of the deck for suspending said second portion of the deck from the vehicle.

20. The invention of claim 19, wherein said first support linkage is coupled with the vehicle at a single location and the second support linkage is coupled with the vehicle at least two locations.

21. The invention of claim 12, wherein said position retainer further comprises a nut received by a threaded portion of the suspension member.

22. The invention of claim 21, wherein said structural member is fixed with a pivotal front axle of a vehicle.

23. The invention of claim 12, wherein said suspension member further comprises a rod member having a longitudinally extending portion which is positioned within the opening in the structural member, and a laterally extending portion which engages the deck at a plurality of laterally spaced locations.

24. The invention of claim 23, wherein said blocking member is a cross pin selectively removable by an operator for allowing the suspension member to be lifted and removed from the opening.

25. The invention of claim 12, wherein the position retainer is adjustable along the longitudinally extending portion of the suspension member for adjusting the position of the mower deck.

26. A mower deck suspension mechanism comprising:
  a suspension member extending between a mower deck and a vehicle, said suspension member having a single longitudinally extending portion positioned and held during vehicle operation within an opening in a structural member fixed with the vehicle, said single longitudinally extending portion being the sole means for coupling the suspension member with the vehicle, said suspension member also comprises a laterally extending portion which is operatively engaged by the deck at a plurality of locations,
  wherein said suspension member is a rod member, said longitudinally extending portion further includes threads upon which a nut is received for blocking the rod member from shifting longitudinally out of the opening in the structural member, and the rod member is shaped to define the laterally extending portion which is engaged by the deck at a plurality of locations.

27. The invention of claim 26, and further comprising a cross pin positioned generally adjacent the rod member for blocking the rod member from shifting within the opening to a position whereat the nut and rod member can pass longitudinally through an enlarged portion of the opening.

28. A mower deck suspension mechanism comprising:
a first support linkage for suspending a first portion of a mower deck from a vehicle, said first support linkage comprising:
  a suspension member, having a longitudinally extending axis, said suspension member operatively engages the deck at a plurality of spaced locations for generally supporting the deck,
  a structural member carried by the vehicle and which includes an opening within which a portion of the suspension member is positioned,
  a position retainer coupled with the suspension member and which is operatively abuttable with the structural member for blocking the suspension member from shifting along its axis out of the opening, wherein engagement of the suspension member within the opening of the structural member is the sole location at which the suspension member is connected to the vehicle,
  a selectively removable blocking member positioned adjacent the opening in the structural member for generally blocking the suspension member from shifting generally laterally with respect to its axis out of the opening, and
wherein said position retainer further comprises a nut received by a threaded portion of the suspension member.

29. The invention of claim 28, wherein said structural member is fixed with a pivotal front axle of a vehicle.

30. A mower deck suspension mechanism comprising:
a first support linkage for suspending a first portion of a mower deck from a vehicle, said first support linkage comprising:

a suspension member, having a longitudinally extending axis, said suspension member operatively engages the deck at a plurality of spaced locations for generally supporting the deck, a structural member carried by the vehicle and which includes an opening within which a portion of the suspension member is positioned, a position retainer coupled with the suspension member and which is operatively abuttable with the structural member for blocking the suspension member from shifting along its axis out of the opening, wherein engagement of the suspension member within the opening of the structural member is the sole location at which the suspension member is connected to the vehicle, a selectively removable blocking member positioned adjacent the opening in the structural member for generally blocking the suspension member from shifting generally laterally with respect to its axis out of the opening, said structural member includes a surface oriented generally perpendicular to the axis of the suspension member, said orientation of said surface allowing the position retainer to slide easily along said surface out of the opening when the blocking member is removed, said suspension member further comprises a rod member having a longitudinally extending portion which is positioned within the opening in the structural member, and a laterally extending portion which engages the deck at a plurality of laterally spaced locations, said blocking member is a cross pin selectively removable by an operator for allowing the suspension member to be lifted and removed from the opening, and said position retainer further comprises a nut received by a threaded portion of the suspension member.

31. The invention of claim 30, wherein said structural member is fixed with a pivotal front axle of a vehicle.

32. The invention of claim 31, and further comprising a second support linkage extending between the vehicle and a second portion of the deck for suspending said second portion of the deck from the vehicle.

33. The invention of claim 32, wherein said first support linkage is coupled with the vehicle at a single location and the second support linkage is coupled with the vehicle at least two locations.

34. A mower deck suspension mechanism comprising:

a structural member carried by a vehicle and which includes an opening, a first support linkage for suspending a first portion of a mower deck from the vehicle, said first support linkage comprising:

a suspension member, having a longitudinally extending axis, said suspension member includes a portion positioned within the opening in the structural member during mowing operation, a position retainer coupled with the suspension member and in operative abutment with the structural member for blocking the suspension member from shifting along its axis out of the opening, a selectively removable blocking member positioned generally adjacent the opening in the structural member for blocking the suspension member from shifting out of the opening generally laterally with respect to its axis, and said position retainer further comprises a nut received by a threaded portion of the suspension member.

* * * * *

UNITED STATES PATENT AND TRADEMARK OFFICE
CERTIFICATE OF CORRECTION

PATENT NO. : 5,937,625
DATED : August 17, 1999
INVENTOR(S) : Brian David Seegert It is certified that error appears in the above-indentified patent and that said Letters Patent is hereby corrected as shown below:

Column 6, line 27, delete "lateral" and insert --laterally--.

Signed and Sealed this

Thirteenth Day of June, 2000

Attest:

Q. TODD DICKINSON

*Attesting Officer*    *Director of Patents and Trademarks*